(12) United States Patent
Traver (10) Patent No.: US 9,770,775 B2
(45) Date of Patent: Sep. 26, 2017

(54) ORBITAL WELDING TORCH SYSTEMS AND METHODS WITH LEAD/LAG ANGLE STOP

(71) Applicant: LINCOLN GLOBAL, INC., City of Industry, CA (US)

(72) Inventor: Richard Dean Traver, San Diego, CA (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 573 days.

(21) Appl. No.: 14/150,173

(22) Filed: Jan. 8, 2014

(65) Prior Publication Data

US 2015/0129579 A1    May 14, 2015

Related U.S. Application Data

(60) Provisional application No. 61/902,553, filed on Nov. 11, 2013.

(51) Int. Cl.
*B23K 9/02* (2006.01)
*B23K 37/02* (2006.01)
(Continued)

(52) U.S. Cl.
CPC .......... *B23K 9/0286* (2013.01); *B23K 9/0282* (2013.01); *B23K 9/122* (2013.01);
(Continued)

(58) Field of Classification Search
CPC .... B23K 9/122; B23K 9/328; B23K 37/0211; B23K 37/0217; B23K 37/0223;
(Continued)

(56) References Cited

U.S. PATENT DOCUMENTS 1,114,793 A    10/1914    Murray
1,704,846 A     3/1929    Stresau
(Continued)

FOREIGN PATENT DOCUMENTS

CA    2422134    9/2004
CN    2675323    2/2005
(Continued)

OTHER PUBLICATIONS

PCT/IB2014/002245; International Search Report and Written Opinion of the International Searching Authority mailed Mar. 2, 2015.
(Continued)

*Primary Examiner* — Geoffrey S Evans
(74) *Attorney, Agent, or Firm* — Foley & Lardner LLP (57) ABSTRACT

The invention described herein generally pertains to systems and methods related to repeatable and accurate setting of welding torch lead and lag positions, particularly with orbital welding systems. Specifically, a torch is coupled with a lead-lag coupler having a stop lug. A stop set with a stop pin is rotated to a desired position of lead or lag and secured. The lead-lag coupler, and torch which rotates therewith, are then unsecured and rotated until the stop lug contacts the stop pin. In this position, the torch is maintained at the desired angle. The stop pin remains in place throughout operation(s) to permit quick, accurate return to the desired angle if the torch is temporarily moved out of position.

22 Claims, 5 Drawing Sheets

(51) Int. Cl.
*B23K 9/028* (2006.01)
*B23K 9/12* (2006.01)
*B23K 9/32* (2006.01)
B23K 101/10 (2006.01)

(52) U.S. Cl.
CPC .......... *B23K 9/328* (2013.01); *B23K 37/0217* (2013.01); *B23K 2201/10* (2013.01)

(58) Field of Classification Search
CPC ............ B23K 37/0235; B23K 37/0276; B23K 37/0282; B23K 37/0286; B23K 2201/06; B23K 2201/10; Y10T 403/32549; Y10T 403/32557; Y10T 403/32591
USPC .......... 219/60 A, 61.4, 60 R; 266/77; 228/45
See application file for complete search history.

(56) References Cited

U.S. PATENT DOCUMENTS

| | | | |
|---|---|---|---|
| 2,138,837 A | 12/1938 | Cadman | |
| 2,445,039 A * | 7/1948 | Rusnok | B23C 1/12 144/135.4 |
| 2,515,302 A * | 7/1950 | Hughey | B23K 7/06 192/129 R |
| 2,547,872 A | 4/1951 | Kissick | |
| 2,587,461 A * | 2/1952 | Gatimel | B23K 7/107 266/77 |
| 2,710,328 A | 6/1955 | Semple | |
| 2,795,689 A | 6/1957 | McNutt | |
| 2,806,125 A | 9/1957 | Miller | |
| 2,845,524 A | 7/1958 | Morley, Jr. | |
| 3,048,691 A | 8/1962 | Longstreth | |
| 3,121,784 A | 2/1964 | McGinty | |
| 3,137,782 A | 6/1964 | Rieppel et al. | |
| 3,179,781 A * | 4/1965 | Ross | B23K 9/0286 219/60 A |
| 3,207,881 A | 9/1965 | Pagan | |
| 3,235,705 A | 2/1966 | Agnew et al. | |
| 3,239,648 A | 3/1966 | Syrigos | |
| 3,323,752 A | 6/1967 | Kurtz et al. | |
| 3,427,428 A | 2/1969 | Nelson et al. | |
| 3,542,996 A | 11/1970 | Bollinger | |
| 3,567,900 A | 3/1971 | Nelson et al. | |
| 3,576,966 A | 5/1971 | Sullivan | |
| 3,602,687 A | 8/1971 | Pollock | |
| 3,604,039 A | 9/1971 | Aldridge | |
| 3,676,640 A | 7/1972 | Bernard et al. | |
| 3,718,798 A | 2/1973 | Randolph et al. | |
| 3,737,614 A | 6/1973 | Paulange | |
| 3,806,691 A * | 4/1974 | Roach | B23H 7/26 219/69.11 |
| 3,806,694 A | 4/1974 | Nelson et al. | |
| 3,815,807 A | 6/1974 | Bartley | |
| 3,826,888 A | 7/1974 | Garfield et al. | |
| 3,839,619 A | 10/1974 | Normando et al. | |
| 3,852,943 A | 12/1974 | Healy | |
| 3,866,485 A | 2/1975 | Blatt | |
| 3,873,798 A | 3/1975 | Friedman et al. | |
| 4,091,258 A | 5/1978 | Kano et al. | |
| 4,132,338 A | 1/1979 | Bove et al. | |
| 4,153,142 A | 5/1979 | Spisz | |
| 4,161,640 A | 7/1979 | Bromwich et al. | |
| 4,168,406 A | 9/1979 | Torrani | |
| 4,196,333 A | 4/1980 | Emmerson | |
| 4,205,828 A * | 6/1980 | Hooper | B23K 7/001 266/63 |
| 4,216,365 A | 8/1980 | Peyrot | |
| 4,255,641 A | 3/1981 | Connell et al. | |
| 4,282,771 A | 8/1981 | Grube | |
| 4,298,783 A | 11/1981 | Schneider et al. | |
| 4,300,034 A | 11/1981 | Schneider et al. | |
| 4,327,898 A * | 5/1982 | Grant | B23K 37/0217 266/67 |
| 4,331,278 A * | 5/1982 | Sherer | B23K 37/0276 219/124.31 |
| 4,343,983 A | 8/1982 | Schneider et al. | |
| 4,346,279 A | 8/1982 | Lessmann et al. | |
| 4,347,421 A | 8/1982 | Mukuda et al. | |
| 4,380,695 A | 4/1983 | Nelson | |
| 4,386,726 A | 6/1983 | Taff | |
| 4,455,471 A | 6/1984 | Ecer et al. | |
| 4,495,401 A | 1/1985 | Sidorov et al. | |
| 4,515,533 A | 5/1985 | Gomez | |
| 4,527,038 A | 7/1985 | Cuny et al. | |
| 4,562,334 A | 12/1985 | Brandt | |
| 4,591,685 A | 5/1986 | Hinger et al. | |
| 4,604,770 A * | 8/1986 | Lang | E05D 11/06 16/363 |
| 4,672,163 A | 6/1987 | Matsui et al. | |
| 4,687,899 A | 8/1987 | Acheson | |
| 4,728,974 A | 3/1988 | Nio et al. | |
| 4,761,596 A | 8/1988 | Nio et al. | |
| 4,841,118 A | 6/1989 | Overbay | |
| 4,856,165 A | 8/1989 | Reuchlein et al. | |
| 4,891,493 A | 1/1990 | Sato et al. | |
| 4,891,494 A | 1/1990 | Baujat | |
| 4,896,812 A | 1/1990 | Kazlauskas | |
| 4,986,002 A * | 1/1991 | Oros | G01B 5/24 33/334 |
| 5,047,608 A | 9/1991 | Takahashi et al. | |
| 5,099,098 A | 3/1992 | Burgoon | |
| 5,155,330 A | 10/1992 | Fratiello et al. | |
| 5,220,144 A | 6/1993 | Jusionis | |
| 5,227,601 A * | 7/1993 | Black | B23K 9/12 219/124.33 |
| 5,642,898 A | 7/1997 | Wise | |
| 5,655,741 A * | 8/1997 | Watkins | F16M 11/08 248/125.9 |
| 5,692,700 A | 12/1997 | Bobeczko | |
| 5,710,403 A | 1/1998 | Jusionis | |
| 5,721,417 A | 2/1998 | Craig | |
| 5,841,089 A | 11/1998 | Martinenas | |
| 5,981,897 A | 11/1999 | Offer et al. | |
| 6,029,940 A | 2/2000 | Klein | |
| 6,091,048 A | 7/2000 | Lanouette et al. | |
| 6,201,207 B1 | 3/2001 | Maruyama et al. | |
| 6,208,512 B1 | 3/2001 | Goldowsky et al. | |
| 6,271,495 B1 | 8/2001 | Rooney | |
| 6,315,259 B1 * | 11/2001 | Kolb | F16M 11/105 248/276.1 |
| 6,380,505 B1 | 4/2002 | Stoops et al. | |
| 6,429,405 B2 | 8/2002 | Belloni et al. | |
| 6,479,795 B1 | 11/2002 | Albrecht et al. | |
| 6,512,195 B2 | 1/2003 | Domschot | |
| 6,609,679 B1 | 8/2003 | Seidel | |
| 6,617,548 B1 * | 9/2003 | Bosio | B23K 9/0286 219/125.11 |
| 6,657,161 B2 * | 12/2003 | Marhofer | B23K 9/0216 219/125.11 |
| 6,696,012 B1 * | 2/2004 | Theriot | B23K 7/006 266/48 |
| 6,953,909 B2 | 10/2005 | Marhofer et al. | |
| 7,034,250 B2 | 4/2006 | Kensrue | |
| 7,114,732 B1 | 10/2006 | Ismail | |
| 7,176,411 B2 | 2/2007 | Enyedy | |
| 7,180,028 B2 | 2/2007 | Flood et al. | |
| 7,205,500 B2 | 4/2007 | Watanabe et al. | |
| 7,208,699 B2 | 4/2007 | Stanzel | |
| 7,252,297 B1 | 8/2007 | Barritt et al. | |
| 7,309,845 B2 | 12/2007 | Domschot | |
| 7,411,147 B2 | 8/2008 | Stanzel et al. | |
| 7,414,220 B2 | 8/2008 | Oyster et al. | |
| 7,423,238 B2 | 9/2008 | Stanzel et al. | |
| 7,455,472 B2 | 11/2008 | Lehner et al. | |
| 7,566,038 B2 | 7/2009 | Scott et al. | |
| 7,755,000 B2 | 7/2010 | Stanzel | |
| 7,952,045 B2 * | 5/2011 | Tsurui | B23H 1/00 219/69.15 |
| 8,096,921 B2 | 1/2012 | Hahn | |
| 8,143,549 B2 | 3/2012 | King, III et al. | |
| 8,167,322 B2 | 5/2012 | Greene | |
| 8,256,659 B2 | 9/2012 | Enyedy et al. | |
| 8,278,601 B2 | 10/2012 | Stanzel | |

(56) References Cited

U.S. PATENT DOCUMENTS

| | | | |
|---|---|---|---|
| 8,338,752 | B2 | 12/2012 | Enyedy et al. |
| 8,357,876 | B1 | 1/2013 | Allford et al. |
| 8,393,059 | B2 | 3/2013 | Dunn |
| 2001/0015349 | A1 | 8/2001 | Belloni et al. |
| 2001/0047988 | A1 | 12/2001 | Hiraoka et al. |
| 2002/0153363 | A1 | 10/2002 | Hiraoka et al. |
| 2004/0012272 | A1 | 1/2004 | Houle et al. |
| 2004/0065644 | A1 | 4/2004 | Hiraoka et al. |
| 2004/0094514 | A1 | 5/2004 | Nista et al. |
| 2005/0098551 | A1 | 5/2005 | Hiraoka et al. |
| 2005/0218132 | A1 | 10/2005 | Wells |
| 2005/0269313 | A1 | 12/2005 | Vinegar et al. |
| 2006/0044089 | A1* | 3/2006 | Kang .................. F16M 11/06 335/114 |
| 2006/0076320 | A1 | 4/2006 | Watanabe et al. |
| 2007/0012671 | A1 | 1/2007 | Hiraoka et al. |
| 2007/0119829 | A1 | 5/2007 | Vietz et al. |
| 2007/0297556 | A1 | 12/2007 | Spencer et al. |
| 2008/0197116 | A1 | 8/2008 | Achtner et al. |
| 2008/0230526 | A1 | 9/2008 | Hiraoka et al. |
| 2009/0039059 | A1* | 2/2009 | Twarog .................. H05H 1/34 219/121.44 |
| 2009/0242352 | A1* | 10/2009 | Altonji ................ F16D 63/006 192/139 |
| 2010/0025907 | A1* | 2/2010 | Strahm ................. B23Q 5/045 269/47 |
| 2010/0133239 | A1 | 6/2010 | Gunzelmann |
| 2010/0183360 | A1 | 7/2010 | Nguyen et al. |
| 2010/0193571 | A1 | 8/2010 | Gunzelmann |
| 2011/0042365 | A1 | 2/2011 | Hiraoka et al. |
| 2011/0072874 | A1 | 3/2011 | Basler et al. |
| 2011/0114613 | A1 | 5/2011 | Ihde |
| 2011/0114616 | A1 | 5/2011 | Albrecht |
| 2011/0132877 | A1 | 6/2011 | Miller et al. |
| 2012/0118864 | A1 | 5/2012 | L'Arvor et al. |
| 2013/0126494 | A1 | 5/2013 | Miller et al. |
| 2013/0126496 | A1* | 5/2013 | Miller ................... F16H 35/00 219/124.34 |
| 2013/0199323 | A1 | 8/2013 | Fong et al. |
| 2013/0277337 | A1 | 10/2013 | Murata |
| 2013/0306710 | A1* | 11/2013 | Kim .................... B23K 37/00 228/45 |

FOREIGN PATENT DOCUMENTS

| | | |
|---|---|---|
| CN | 102974960 | 3/2013 |
| DE | 965794 | 6/1957 |
| DE | 3238496 | 10/1982 |
| DE | 102010028745 A1 * | 11/2011 |
| EP | 0025989 | 9/1980 |
| EP | 1779963 | 2/2007 |
| EP | 2020272 | 2/2009 |
| EP | 2106872 | 10/2009 |
| EP | 2216120 | 8/2010 |
| EP | 2216121 | 8/2010 |
| EP | 2216122 | 8/2010 |
| EP | 2216123 | 8/2010 |
| EP | 2495817 | 9/2012 |
| GB | 848941 | 9/1960 |
| GB | 1142854 | 2/1969 |
| GB | 1272568 | 5/1972 |
| JP | 55100877 | 8/1980 |
| JP | S6199581 A | 5/1986 |
| JP | H02255272 | 10/1990 |
| JP | H07111759 | 10/1993 |
| JP | H0641972 | 6/1994 |
| JP | 08215841 | 8/1996 |
| JP | H09285867 | 11/1997 |
| JP | H11197841 | 7/1999 |
| KR | 201000129435 | 12/2010 |
| KR | 20120025801 A | 3/2012 |
| NL | 7401239 | 1/1974 |
| SU | 322247 | 9/1970 |
| WO | 95/23060 | 8/1995 |
| WO | 03/044375 A1 | 5/2003 |
| WO | 2008025553 A2 | 8/2007 |
| WO | WO-2010/026568 A1 * | 3/2010 |
| WO | 2010/089184 | 8/2010 |
| WO | 2012020249 A2 | 2/2012 |
| WO | 2012/097626 | 7/2012 |
| WO | 2013072747 | 5/2013 |

OTHER PUBLICATIONS

Polysoude The Art of Welding, Tig—With or without Filler Wire, AVC, OSC, Open Welding Head for Welding of Tube to Tube Joints, Tube to Elbow Joints . . . , Polysoude S.A.S. France (Mar. 2011).

Using compact, full-function weld heads; 2013 Limited Clearance/ARC Machines, Inc., 10500 Orbital Way, Pacoima, CA 91331; Mar. 14, 2013.

Accra Wire Website, section on Weld Wire Dereelers, http://www.accuainc.com/weldwire.html, 3 pages, retrieved Nov. 13, 2014.

International Preliminary Report on patentability issued on PCT/IB2014/002245, mailed May 17, 2016.

* cited by examiner

ORBITAL WELDING TORCH SYSTEMS AND METHODS WITH LEAD/LAG ANGLE STOP

CROSS-REFERENCE TO RELATED APPLICATIONS AND INCORPORATION BY REFERENCE

This U.S. patent application is a continuation of and claims the benefit of U.S. provisional patent application 61/902,553 filed on Nov. 11, 2013, which is incorporated herein by reference in its entirety.

TECHNICAL FIELD

In general, the present invention relates to controlling the angle of an electrode in connection with an orbital welding system. More particularly, the present invention relates to accurately and repeatably angling a welding torch in an orbital welding system, and enabling quick return to one or more selected angles based when the torch is moved.

BACKGROUND OF THE INVENTION

In industrial production, welding may involve raising, cladding, building up, filling, hard facing, overlaying, joining, and other welding applications. When confronted with a work piece having a curved surface, an orbital welding process may be used to rotate the welding head to apply a weld to the curved surface. The most common examples where orbital welding is used is the welding of pipe. Pipe welding may include thin walled application where the welding head is rotated about the outer surface between two piece ends of pipe. Alternatively, pipe welding may include deep groove geometries where the welding electrode extends into a groove formed between the two pipes being joined to lay down successive beads of weld material to fill the groove to join the thick walled pipes. Orbital welding systems may include a welding head that is mounted on a guide track or a fixture that clamps or is otherwise supported on the workpiece and rotated to supply a weld.

One parameter influencing the outcome of welding operations, including orbital welding operations, is the lead or lag angle of the welding torch. The lead or lag angle of the torch can be measured as the angle formed by a straight line from the electrode and a line perpendicular to the weld axis (or the line through the center of the weld along its length). Lead and lag angles are important because they influence the penetration of the welding torch as well as the geometry and consistency of the weld bead. A torch inclined in the direction of the orbital welder's motion is said to have a lead angle, while a torch inclined opposite the direction of the orbital welder's motion is said to have a lag angle. In other words, with a lead angle, the arc is pointed in the direction of unwelded base metal as the weld progresses. Other definitions of lead and lag are provided with reference to the electrode's leaning toward filler wire (lead) or away from filler wire (lag). Zero lead/lag angle occurs when the torch is perpendicular to the surface being welded, or a plane defined by the point being welded in nonlinear applications.

Thus, it is clearly important to control lead or lag angle to ensure proper welding in terms of structural integrity and aesthetics. Various techniques for applying lead or lag angle suffer from common drawbacks. An example of deficiencies in the art includes the inability to simply and rapidly readjust to a specific angle. While dials, linkages, and other complex apparatuses have been employed, these require adjustment to and re-setting at a desired angle with every change. In another example of shortcomings in the art, no means to accurately measure lead or lag angle or establish a repeatable reference point is provided. Welding attachments or controls employing flexible necks, probes or rollers about which the weld head automatically adjusts, or non-scaled adjusting members exhibit these deficiencies.

These complexities are multiplied when utilizing an orbital welder, as opposed to earlier or alternative welding equipment. In situations employing orbital welders and others, lead and lag angle control can be managed by an operator lacking a measurable frame of reference for repeatability. In fact, it is not uncommon for operators to attempt awkward employment of protractors when configuring the lead or lag angle of a welding torch. For example, a user manual for earlier products states explicitly: "The use of a Protractor is recommended for a precise setting of TILT and LEAD/LAG." See, e.g., Arc Machines MODEL 77 WELD HEAD OPERATION MANUAL, Dec. 12, 2007. Even if the use of a protractor is accurate in some circumstances (a result not guaranteed), this technique is slow and requires diligent care and external means for recording earlier angles.

While burdensome during an initial setup, the inconvenience of utilizing protractors or rough estimation is compounded in situations in which a welding torch is manipulated, changing the lead or lag angle, during a welding operation. For example, the accumulation of spatter in a welding nozzle frequently necessitates the nozzle be cleaned before an operation can be completed. Both consumable and nonconsumable electrodes can experience problems requiring operator intervention to cure. Such operations may require rotation of the welding torch away from the work piece, and at times necessitate full removal of a welding torch from an orbital welding assembly. Further, some welding operations utilize varying or multiple lead or lag angles throughout a process, which can also entail challenging operator manipulation, especially when components are hot or welded portions of a work piece are still malleable.

Accordingly, orbital welding heads can be improved by integrating systems that allow for quick setting or resetting of lead or lag angle and/or accurate, repeatable measurement of lead or lag angle in varying conditions, particularly when employing orbital welders.

SUMMARY OF THE INVENTION

In accordance with an embodiment of the present invention, a welder system includes an orbital welder having a main body assembly supported adjacent to a workpiece. An associated welding torch includes an electrode that forms a weld joint on the workpiece. A torch adapter is provided connected to the main body assembly, and the torch adapter includes a shaft sleeve. An adjustment shaft rotatably couples with the torch adapter via the shaft sleeve, and a lead-lag coupler connects to the adjustment shaft. At least one stop lug is disposed to one side of the lead-lag coupler, and a rotatable stop set is disposed around the shaft sleeve. The rotatable stop set includes a stop pin.

In accordance with another embodiment of the present invention, a method of applying a lead or a lag angle to a welding torch is provided. The method comprises rotating a stop set to place a stop pin at a stop pin position associated with a set torch position, where the set torch position defined in relation to one of a lead angle or a lag angle. The method further comprises rotating a stop lug of a lead-lag coupler operatively coupled with the welding torch to contact the stop pin. The method additionally includes securing the lead-lag coupler at a lead-lag coupler position associated with the set torch position.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

The disclosure herein generally pertains to systems and methods related to accurate, repeatable setting of welding torch lead and lag angles in orbital welding systems. Such systems and methods allow one or more torch head positions, including lead or lag angle, to be set to a set torch position using movable stops, known-position detents, and others. This enables an operator to quickly move the torch to or from multiple known positions, ensuring the torch angle will return to the same set torch position(s) each time. In some embodiments, an operator may accurately set the torch angle by viewing a measurable angle on a scale. Further, the components of the invention permit other adjustments, such as the torch offset in reference to a work piece, a torch height in relation to the work piece, and angles other than lead or lag such as a work or bevel angle.

Specifically, in one embodiment, a torch is coupled with a lead-lag coupler having at least one stop lug. A stop set with a stop pin is rotated along the graduated angular scale to a desired lead or lag angle and secured at this position, which can be a known position for a particular welding operation, maintenance access to the torch, or another position to and from which the torch may be moved repeatedly (e.g., a set torch position). After the stop pin is placed at the desired angle, the torch and lead-lag coupler are then unsecured and rotated until a stop lug contacts the stop pin. In this position, the torch is maintained at the desired position. The stop pin remains in place throughout the operation(s) to permit quick, accurate return to the desired angle if the torch is temporarily moved out of position. Thus, a consistent, hard stop is available at pre-set locations (set torch positions).

While examples of set torch positions are provided above, it is understood that this term can be used in reference to multiple components, or variants can refer to such components' positions when the torch is in the set torch position. Specifically, in reference to a stop pin, a set torch position is defined by an associated location at which the stop pin is located to effect the set torch position. In reference to a stop lug, a stop lug position is associated with the set torch position, where the stop lug appropriately contacts the stop pin to effect the set torch position. In reference to a lead-lag coupler, a lead-lag coupler position is the position of the coupler to place the stop lug into appropriate contact with the stop pin and effect the set torch position. In reference to the torch, it is one or more desired locations and orientations of the torch. Those of ordinary skill in the art will thus appreciate that "set torch position" and similar terms may be used flexibly to indicate the respective positions of multiple components which interact by way of systems and methods disclosed herein.

In further embodiments, a detent and corresponding notch can be utilized at one or more locations, such that the stop set will place a thereafter-aligned torch at a known angle (e.g., true vertical or zero lead/lag) when the detent is employed.

In further alternative or complementary embodiments, the lead-lag coupler includes an index or graduated angular scale. In this fashion, specific angles can be set or measured with respect to lead or lag. Such a configuration is generally illustrated in the figures.

Nonetheless, while aspects herein depict embodiments having graduated angular markings on a scaled member, one of ordinary skill will appreciate that it is not required to include such scales, or that such scales need not be used in conjunction with or be calibrated to any specific component. For example, a lead/lag stop comprising a stop set, a stop pin, and one or more stop lugs can be utilized without measuring an angle. In this way, operators may use their judgment setting a lead or lag angle without an arbitrary frame of reference and still benefit from the speed with which the lead or lag angle can be reset after determining the position once.

Various knobs or releases can be located or arranged for quick locking and unlocking, easy handling and manipulation, or other configurations that permit positioning. While the disclosure herein describes specific handles, it is understood that types other than those illustrated may be utilized without departing from the scope or spirit of the innovation.

"Welding" or "weld" as used herein including any other formatives of these words will refer to depositing of molten material through the operation of an electric arc including, but not limited to, submerged arc, GMAW, MAG, MIG, TIG welding, or any electric arc used with a welding system, an orbital welding system, or non-orbital welding system.

Figure 1:
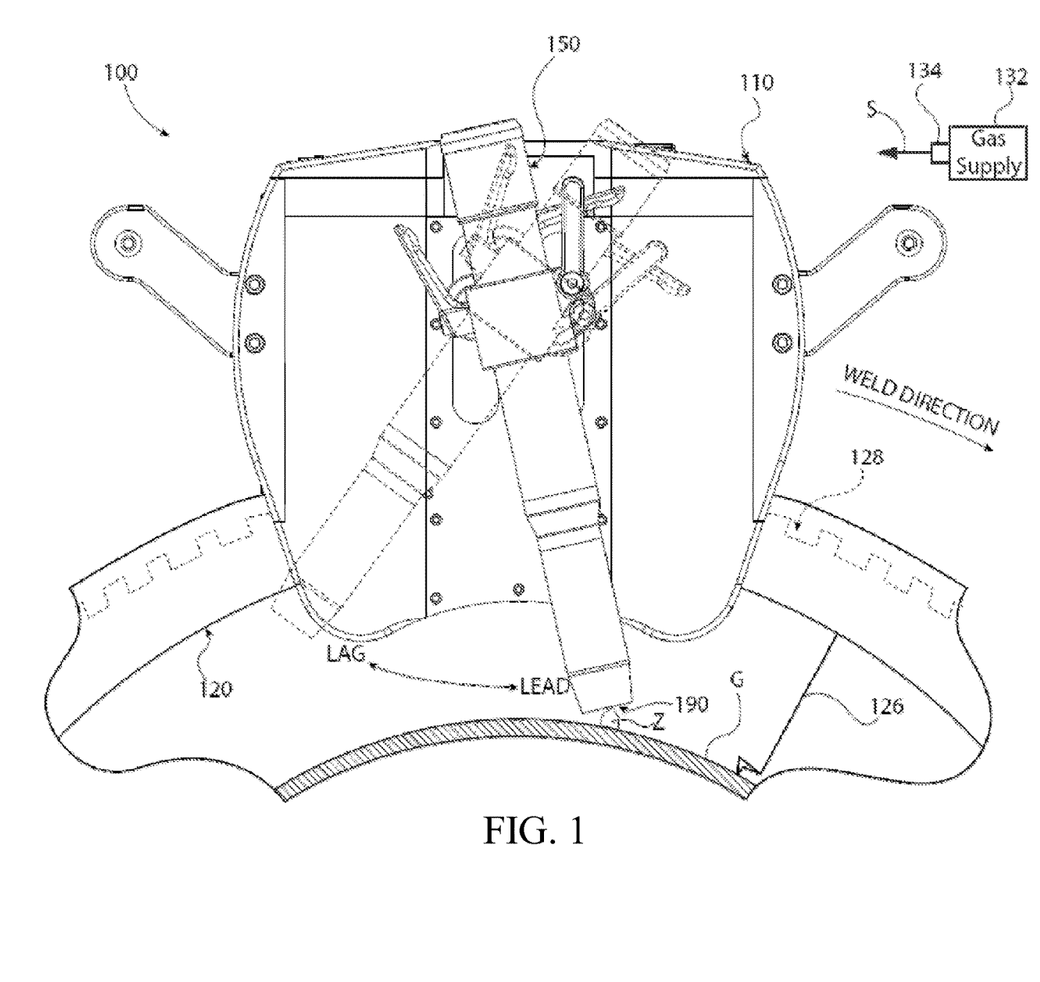
FIG. 1 illustrates a view of an orbital welding system on a track attached to a work piece.

FIG. 1 shows orbital welding system 100 independent of a work piece for welding. Orbital welding system 100 is an orbital welding system used for welding substantially cylindrical work pieces. Orbital welding system 100 includes at least welding head 110 and welding track assembly 120.

Welding head 110 includes welding torch assembly 150. Welding torch assembly 150 can include a consumables line (not pictured) which attaches to the torch of welding torch assembly 150 opposite the work piece. In alternative embodiments, one or more wire, gas, or electrical lines can be provided through other components. Welding head 110 is at least in part a tractor configured to move about the circumference of a work piece (and accordingly change the position of welding torch assembly with respect to the work piece) along welding track assembly 120. The welding torch assembly includes an electrode 190 adapted to form a weld joint on the work piece.

Welding track assembly 120 may be provided in multiple sections which are assembled about a work piece. For example, welding track assembly 120 may include first and second track sections which are coupled to attach around a work piece. Welding track assembly 120 includes one or more feet 126 disposed inwardly which are adjusted after coupling the one or more sections of track to the work piece to provide a secure fit to the work piece. Tractor track 128 is disposed outwardly along track assembly 120 and defines a path which welding head 110 travels while completing a circumferential weld on a work piece. In embodiments, tractor track 128 is continuous between first and second track sections, permitting welding head 110 to travel 360-degrees about the work piece. Alternatively, tractor track 128 is discontinuous, and welding head 110 only travels approximately 180-degrees in any single pass of the path provided by tractor track 128.

Orbital welding system 100 is shown in FIG. 1 from a perspective parallel to the length of the work piece. Welding head 110 is shown supported on a welding track assembly 120 in contact with a work piece via feet 126. Orbital welding system 100 includes a welding torch assembly 150, having a welding electrode 190 for depositing weld material to form a weld joint at welding zone Z. Electrode 190 may be an extended electrode having an electrode length suitable for the groove G being welded. This example is not limiting, as electrodes having greater or lesser lengths may be used depending on the depth of the groove G. Alternatively, electrode 190 is recessed in welding torch assembly 150.

Welding torch assembly 150 is connected to a shield gas supply 132 which provides a gas used in welding, such as (but not limited to) an inert gas, to welding torch assembly 150. Welding gas supply 132 may include a container, such as a cylinder, that stores shield gas S under pressure, and delivery of shield gas S, via appropriate tubing or other conduits, may be controlled by a regulator or other controller 134. A non-pressurized source may be used also with gas delivery provided by a pump or the like. When welding thick plates or heavy wall pipes, the weld joint design typically provides a narrow groove to permit an elongated electrode to be placed in the joint with some adjustment of the torch angle to assure a good weld created by layering a series of weld beads upon each other until the joint is filled. This process may be referred to as narrow groove welding or deep groove welding interchangeably throughout the following description. Narrow groove welding is a process where successive single bead weld layers are applied on top of one another in a narrow groove or joint. One of the considerations in the narrow groove environment is maintaining sufficient shield gas to protect the molten weld puddle from atmospheric contamination. In some embodiments, an inert shield gas, such as Argon, is provided from outside the weld joint with a long electrode extending into the groove below the shield gas supply. While aspects herein have discussed deep groove welding or other specific operations, it is understood these aspects are provided for purposes of explanation only, and that different welding operations can be utilized without departing from the scope or spirit of the innovation.

Figure 2A:
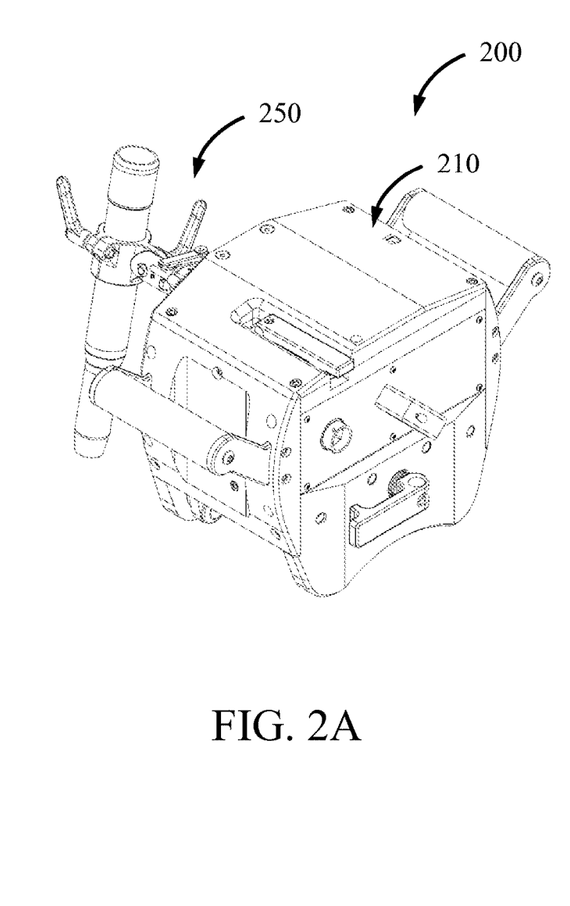
FIGS. 2A and 2B illustrate different views of an embodiment of an orbital welding system configured for use with the subject innovation.
Figure 2B:
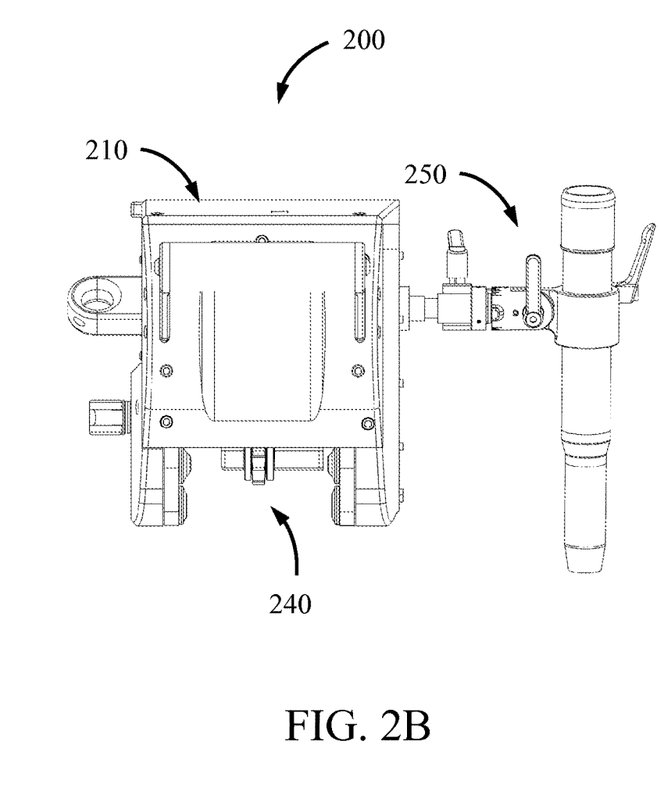

FIGS. 2A and 2B show views of an orbital welding head 200. Orbital welding head 200 includes main body assembly 210 having tractor assembly 240 and torch assembly 250. Tractor assembly 240 is configured to securely couple orbital welding head 200 with an orbital welding track assembly (e.g., such as welding track assembly 120) and permit orbital welding head 200 to travel at least a portion of the circumference of a round work piece.

Figure 3:
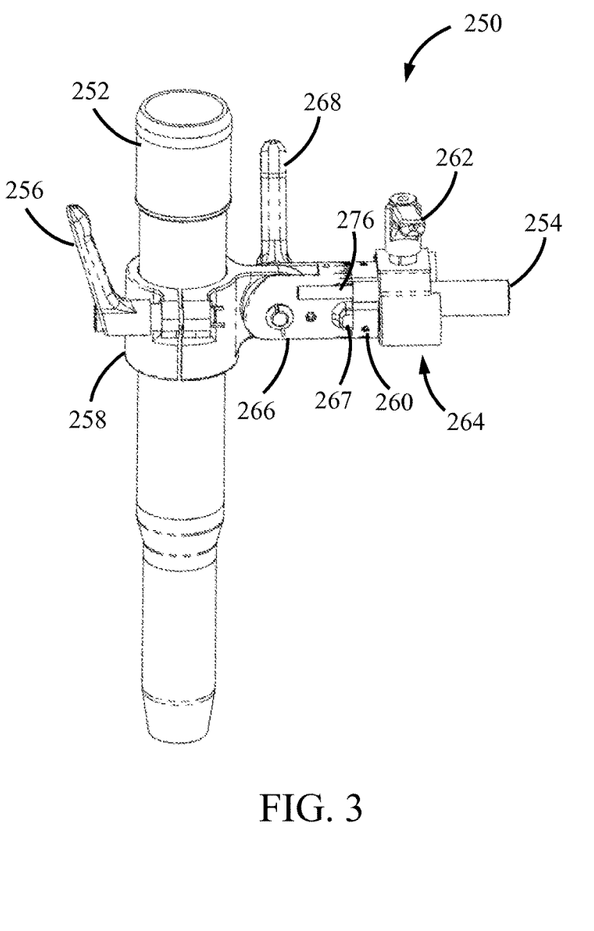
FIG. 3 illustrates an assembled view of a welding torch assembly.
Figure 4:
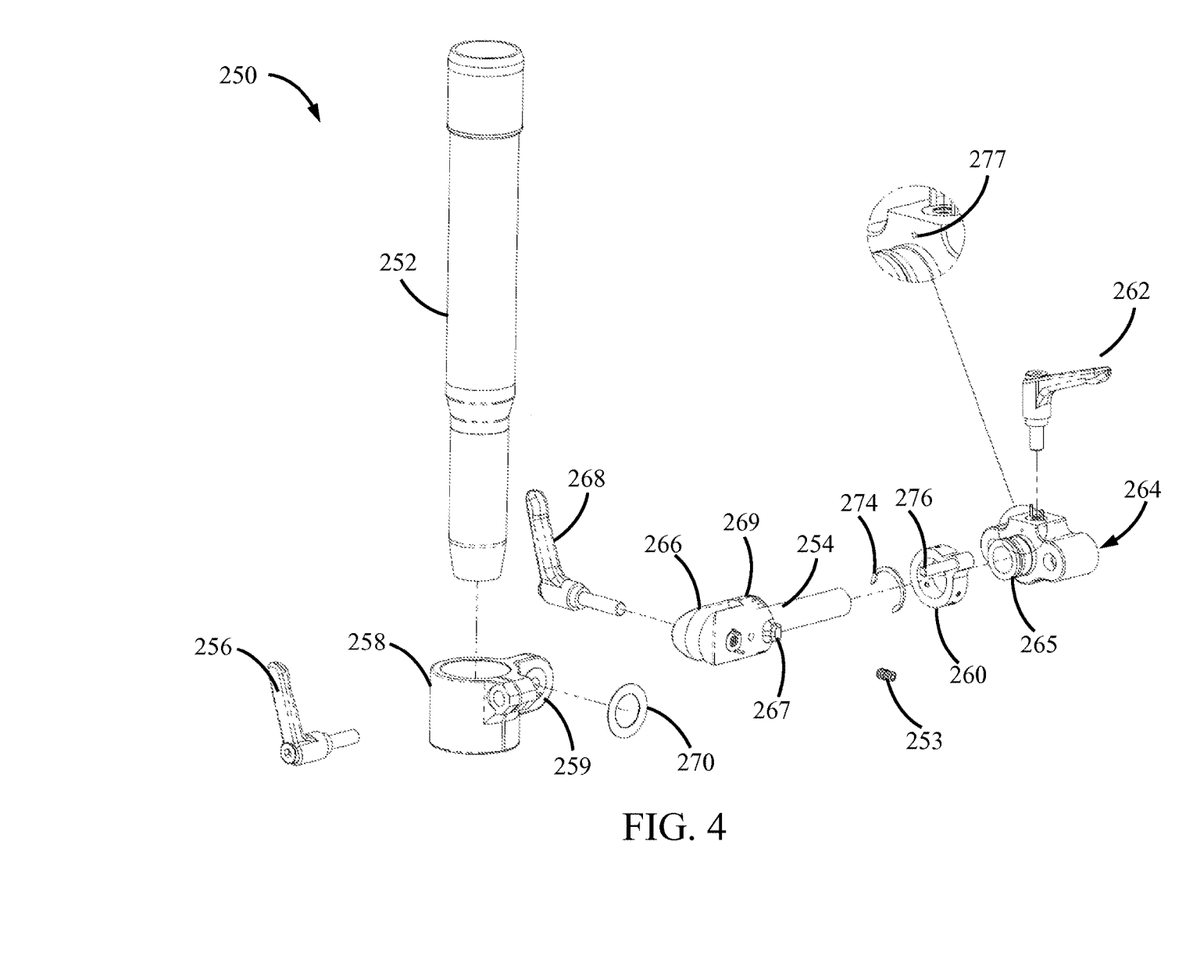
FIG. 4 illustrates an exploded view of a welding torch assembly.
Figure 5:
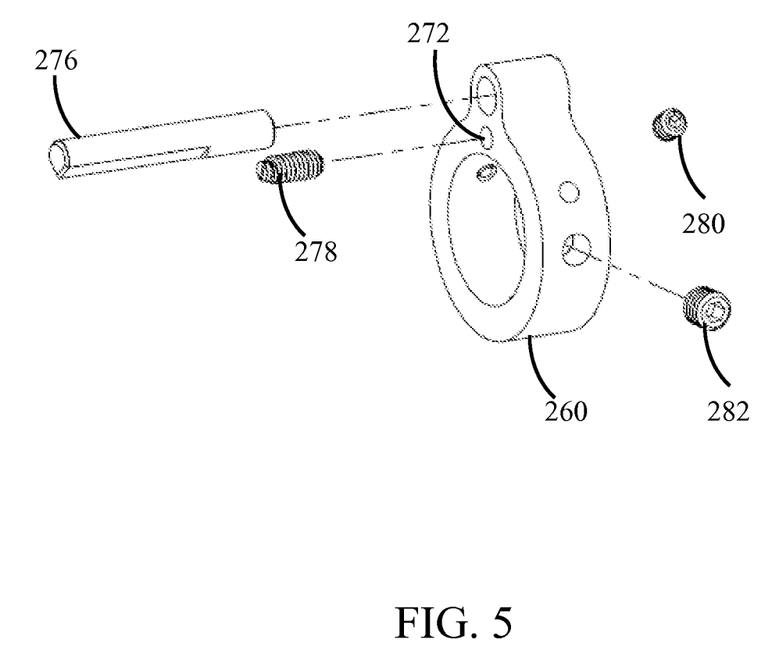
FIG. 5 illustrates an exploded view of a stop set of the welding torch assembly.

FIGS. 3-5 show torch assembly 250, or subcomponents thereof, in greater detail. Specifically, FIG. 4 shows torch assembly 250 assembled as when mounted to main body assembly 210 and FIG. 5 shows an exploded view of the same. FIG. 5 specifically illustrates lead-lag stop set 260 in exploded view. Torch assembly 250 can be used to orient torch 252 in various dimensions with respect to a weld, or direct torch 252 in another direction for various other purposes.

Torch assembly 250 can be configured to couple with main body assembly 210 of orbital welding head 200 via one or both of torch adapter 264 and adjustment shaft 254. In some embodiments, extensions from main body assembly 210 mate with torch adapter 264 to fixedly or movably couple torch assembly 250 to main body assembly 210. In some such embodiments, adjustment shaft 254 can be moved inward, outward, and rotationally with respect to torch adapter 264, but does not provide additional support through contact with main body assembly 210. In alternative embodiments, adjustment shaft 254 extends through torch adapter 264, and provides additional mechanical connectivity with main body assembly 210 such that at least a portion of the coupling between torch assembly and main body assembly is supported by adjustment shaft 254.

Shaft 254 and portions interfacing with torch adapter 264 can be of solid construction. However, in alternative embodiments, torch adapter 264 and/or adjustment shaft 254 can include hollow portions configured to provide electrical, mechanical, or fluid connectivity to torch 252. For example, one or more of an electrical power line, gas line, or consumable electrode may be routed through such components (or others) to reach torch 252.

Torch adapter 264 has coupled thereto adjustment handle 262. Adjustment handle 262 can include a portion extending through torch adapter 264 which contacts adjustment shaft 254 when adjustment handle 262 is tightened, such that adjustment shaft 254 is secured in place, and adjustment shaft 254 cannot shift inward or outward, or rotate. In an alternative embodiment, adjustment handle 262 tightens the fit of torch adapter 264 onto adjustment shaft 254 and torch adapter 264 provides the friction to secure adjustment shaft 254 into position. Tightening or loosening of adjustment handle 262 can be performed by any suitable means, but in embodiments can be performed using a threaded connection between adjustment handle 262 and torch adapter 264. In alternative embodiments, various alternative clamping, locking, nesting, snapping, and other means of tightening or locking can be utilized. Quick-release mechanisms can be employed which require only a small range of motion to lock and unlock adjustment handle 262 or associated components. In at least one embodiment, when adjustment handle 262 is unlocked, adjustment shaft 254 can moved inward or outward to change the offset of the torch with respect to the weld. In this fashion, multiple close welds can be performed without moving the track of the orbital welder, or an offset can be applied to allow the same weld position to be reached when torch 252 is directed at an angle using swivel joint 259 and coupler handle 268.

Adjustment shaft 254 is connected to lead-lag coupler 266. Lead-lag coupler 266 in turn connects with torch clamp 258 via swivel joint 259 to provide mechanical linkage between torch adapter 264 (and accordingly main body assembly 210) and torch 252. Torch clamp 258 is loosened or tightened to retain or release torch 252 using clamp handle 256. When loosened, torch 252 can be moved up or down in torch clamp 258 to adjust the gross height (e.g., distance from work piece) of torch 252. In alternative or complementary embodiments, other securing means can be integrated with clamp handle 256, including but not limited to alternative quick-release mechanisms that can be employed which require only a small range of motion to lock and unlock clamp handle 256 or associated components.

In the illustrated embodiment, lead-lag coupler 266 is fixedly connected to adjustment shaft 254 and these components rotate simultaneously and equally. However, in alternative embodiments, lead-lag coupler 266 rotates independent of adjustment shaft 254 to change the lead or lag of torch 252. In embodiments where lead-lag coupler 266 rotates independent of adjustment shaft 254, similar handles, screws, or locking mechanisms may be employed, or additional securing means can be provided to immobilize lead-lag coupler 266 with reference to adjustment shaft 254.

Lead-lag coupler 266 and adjustment shaft 254 can be made of single-piece construction, or can be connected or joined by fabrication of two or more pieces. In at least one embodiment, lead-lag coupler 266 includes graduated angular markings 269 about its circumference which permit consistent reference to a particular angle of lead-lag coupler 266 and other components of torch assembly 250. Because torch clamp 258 is pinned to lead-lag coupler 266 using coupler handle 268 in a fashion that prohibits rotation of torch clamp 258 or torch 252 about the rotational dimension applicable to graduated angular markings 269, the relative angle shown in relation to graduated angular markings 269 on lead-lag coupler 266 will also be reflected in the lead or lag angle of torch 252. Coupler handle 268 can be retained or connect with, for example, coupling screw 253. The combination of coupler handle 268 and coupling screw 253, and/or other components, can provide a tensioning effect to maintain a position of torch 252 even when coupler handle 268 is loosened to permit hand adjustments to torch 252. In alternative or complementary embodiments, other securing means can be integrated with coupler handle 268, including but not limited to alternative quick-release mechanisms that can be employed which require only a small range of motion to lock and unlock coupler handle 268 or associated components.

In embodiments alternative to those illustrated, lead-lag coupler 266 does not include a scale or markings. In this way, an operator may set arbitrary lead or lag angles, or other angles, without orientation to any frame of reference.

Lead-lag coupler 266 also includes stop lug 267. In alternative embodiments, there can be more than one stop lug 267, and/or stop lug 267 is movable (e.g., can be slid, rotated, or removed and replaced) about a perimeter of lead-lag coupler 266. Stop set 260 is disposed between torch adapter 264 and lead-lag coupler 266. Stop set 260 includes stop pin 276. Stop set 260 can be rotated to orient stop pin 276 at a position associated with a set torch position. In embodiments, stop pin 276 can include a flat or sharp side that provides a clear edge against graduated angular markings 269 regardless of viewing angle or distance, ensuring accurate reading of graduated angular markings 269.

Stop set 260 has an inner diameter wider than the diameter of adjustment shaft 254, and is retained over shaft sleeve 265, as lead-lag coupler 266 blocks motion of stop set 260 in the direction of the length of adjustment shaft 254. In this configuration, adjustment shaft 254 and fixedly coupled components can rotate without requiring rotation of stop set 260.

In practice, stop set 260 is rotated such that stop pin 276 aligns with an angle measured in reference to graduated angular markings 269. Stop set 260 can be secured at a particular angle, or loosened for rotation, using set screw 282, which can be a single set screw or a plurality of set screws around stop set 260. Tensioning screw 280 can be one or more screws used to retain stop set 260 when set screw 282 is loosened, or to provide additional friction or resistance to avoid free spinning of stop set 260 when loosened.

Once an angle is set by loosening stop set 260, rotating stop set 260 until stop pin 276 is aligned with the angle, and re-tightening stop set 260, rotation of adjustment shaft 254 and fixedly coupled components occurs through the arc defined by the angle between stop pin 276 and stop lug 267. Adjustment handle 262 can be loosened, and torch 252 can be rotated to a desired angle. Lead-lag coupler 266, by virtue of its pinned coupling with torch clamp 258, rotates with torch 252. When stop lug 267 rotates into contact with stop pin 276, torch 252 will have traversed the angle required to reach the angle set using stop set 260.

Stop set 260 can further include detent recess 272 with detent 278 thereafter. A matching dimple or notch, detent notch 277, is included on a face of torch adapter 264. When matched with detent notch 277, detent 278 can snap stop set 260 into, for example, a vertical position indicative of zero lead/lag. Various other detents or other components can be utilized to permit quick identification of other positions. For example, a detent can be included every 30 degrees, every 90 degrees, or at angles commonly used in specific welding operations. In a further example, stop set 260 can be swapped by disassembling at least a portion of torch assembly 250 to allow different detent positions to be employed.

In embodiments, one or both of stop pin 276 and stop lug 267 can be offset or arranged to account for the angular space occupied by these components when selecting an angle at which to set torch 252. For example, stop lug 267 can include a recess, bevel, or concave section configured to accept at least a portion of stop pin 276. Further, one or both of stop pin 276 and stop lug 267 can have lengthened or adjustable geometries to permit contact between stop pin 276 and stop lug 267 when adjustment shaft 254 is extended outward.

Various additional components can be used to facilitate smooth interfaces, component longevity, or other ends. For example, circlip 274 can be displaced between stop set 260 and lead-lag coupler 266, and washer 270 can be employed with torch clamp 258. In some embodiments, these or other components (e.g. tensioning screw 280 or other components) can assist with tensioning or increasing friction to avoid "dropping" of components due to gravity after a handle is loosened.

Further, alternative embodiments of systems utilizing an angular scale and stopping components with a welding torch other than those illustrated can be embraced under the disclosures herein. For example, an angular scale can be engraved or printed on a non-rotating component (e.g., torch adapter 264), and an angular indicator such as a stop pin can be located on rotating portions of a system. Thus, based on a position of adjustment shaft 254 or similarly-coupled components, an angle may be read without having to previously set such angle by loosening a stop. In such embodiment, set screws or other friction-locking techniques can be employed in conjunction with torch adapter 264 and/or shaft sleeve 265 thereof.

In accordance with such aspects, torch 252 can be employed using a fixed lead or lag angle. Stop set 260 is rotated such that stop pin 276 reflects the appropriate angular value of the lead angle or lag angle and secured at such value. Thereafter, adjustment handle 262 can be loosened, and torch 252 is rotated with lead-lag coupler 266 until stop lug 267 contacts stop pin 276. Adjustment handle 262 can thereafter be retightened to lock torch 252 at the appropriate angle for operation. If torch 252 is to be rotated to a different angle or detached, stop set 260 is left in place to facilitate a quick return to the identical position by rotating torch 252 until stop lug 267 again contacts stop pin 276. In the event the operator wishes to return torch 252 to a precise vertical alignment, stop set 260 can be rotated to align with detent 278 to provide rapid reference to zero lead/lag.

In one or more embodiments, two or more stop lugs 267 can be utilized without departing from the scope or spirit of the innovation. For example, a first stop lug 267 can be provided on one side of lead-lag coupler 266, and a second stop lug 267 can be provided on an opposite side of lead-lag coupler 266. Further, one or more safety stops (not pictured) can be included to prevent rotation (e.g., lead or lag angle, or others) of the torch or other components beyond a certain point. This can mitigate risks related to, for example, twisting of support lines, pointing of the torch in unsafe directions, and spinning to the wrong side of a stop lug 267.

In addition, while clamp handle 256, adjustment handle 262, and coupler handle 268 are illustrated in particular positions, it is understood that their orientation or geometries may be modified from the configurations depicted to accommodate various functional or design interests.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

While the embodiments discussed herein have been related to the systems and methods discussed above, these embodiments are intended to be exemplary and are not intended to limit the applicability of these embodiments to only those discussions set forth herein. The control systems and methodologies discussed herein are equally applicable to, and can be utilized in, systems and methods related to specific welding or metallurgy practices not expressly discussed (such as arc welding, laser welding, brazing, soldering, plasma cutting, waterjet cutting, laser cutting, and any other systems or methods using similar control methodology) without departing from the spirit of scope of the above discussed inventions. The embodiments and discussions herein can be readily incorporated into any of these systems and methodologies by those of skill in the art.

What is claimed is:

1. A welder system, comprising:
    an orbital welder having a main body assembly configured to be supported adjacent to a workpiece;
    a welding torch that includes an electrode configured to form a weld joint on the workpiece;
    a torch adapter connected to the main body assembly, wherein the torch adapter includes a shaft sleeve;
    an adjustment shaft rotatably coupled with the torch adapter via the shaft sleeve;
    a lead-lag coupler connected to the adjustment shaft;
    at least one stop lug disposed to one side of the lead-lag coupler; and
    a rotatable stop set disposed around the shaft sleeve, wherein the rotatable stop set includes a stop pin.

2. The welder system of claim 1, wherein the lead-lag coupler includes graduated angular markings about a perimeter of the lead-lag coupler.

3. The welder system of claim 2, wherein the graduated angular markings are associated with one of a lead angle and a lag angle.

4. The welder system of claim 2, wherein an angular orientation of the welding torch is defined in reference to the graduated angular markings.

5. The welder system of claim 1, wherein at least one of the at least one stop lug and the stop pin contact at a point associated with a set torch position.

6. The welder system of claim 1, further comprising one or more set screws of the rotatable stop set to resist rotation of the rotatable stop set.

7. The welder system of claim 1, further comprising an adjustment handle that immobilizes the adjustment shaft.

8. The welder system of claim 1, further comprising a torch clamp operatively connected to the torch and the lead-lag coupler.

9. The welder system of claim 8, wherein the torch clamp includes a swivel joint that allows rotation of the torch with respect to the lead-lag coupler transverse to rotation of the lead-lag coupler.

10. The welder system of claim 9, further comprising a coupler handle that closes to resist rotation of the torch clamp with respect to the lead-lag coupler.

11. The welder system of claim 8, further comprising a torch clamp handle that closes the torch clamp to immobilize the welding torch in the torch clamp.

12. The welder system of claim 1, further comprising a recess of the stop lug, wherein dimensions of the recess are based at least in part on a geometry of the stop pin.

13. The welder system of claim 1, further comprising:
    a detent recess of the stop set;
    a detent within the detent recess; and
    a detent notch of the torch adapter associated with a vertical position of the stop pin, the torch is in zero lead/lag with the stop lug contacting the stop pin in the vertical position.

14. The welder system of claim 1, wherein the adjustment shaft moves inward or outward to change a transverse position of the torch transverse to a weld seam.

15. The welder system of claim 1, wherein the adjustment shaft is rotatably coupled with the torch adapter such that the welding torch is configured to rotate about an axis of the adjustment shaft.

16. The welder system of claim 1, wherein the rotatable stop set extends entirely around a circumference of the shaft sleeve and is rotatable about the shaft sleeve.

17. A method of applying a lead or a lag angle to a welding torch, comprising:
   rotating a stop set to place a stop pin at a stop pin position associated with a set torch position, the set torch position defined in relation to one of a lead angle or a lag angle;
   rotating a stop lug of a lead-lag coupler operatively coupled with the welding torch to contact the stop pin; and
   securing the lead-lag coupler at a lead-lag coupler position associated with the set torch position, wherein the lead-lag coupler position is a position at which the stop lug contacts the stop pin.

18. The method of claim 17, further comprising securing the stop set at a stop set position associated with the set torch position.

19. The method of claim 17, further comprising repositioning an adjustment shaft to move the torch and the lead-lag coupler transverse to a weld seam.

20. The method of claim 17, further comprising:
   opening a coupler handle that controls rotation between a swivel joint of a torch clamp and the lead-lag coupler; and
   rotating the welding torch with respect to the lead-lag coupler in a direction transverse to a weld seam.

21. The method of claim 17, further comprising:
   rotating the welding torch to a non-operating position; and
   rotating the welding torch to the set torch position by placing the stop lug of the lead-lag coupler in contact with the stop pin.

22. The method of claim 21, further comprising cleaning the welding torch after rotating the lead-lag coupler and connected welding torch to the non-operating position and before rotating the welding torch back to the set torch position.

* * * * *